United States Patent [19]

Brüne et al.

[11] 4,060,199

[45] Nov. 29, 1977

[54] ELECTROMAGNETIC FUEL INJECTION VALVE

[75] Inventors: Gerhard Brüne; Waldemar Hans, both of Bamberg, Germany

[73] Assignee: Robert Bosch G.m.b.H., Stuttgart, Germany

[21] Appl. No.: 727,701

[22] Filed: Sept. 29, 1976

[30] Foreign Application Priority Data

Oct. 1, 1975 Germany ............................ 2543805

[51] Int. Cl.[2] ............................ F16K 31/06; B05B 1/34

[52] U.S. Cl. ........................................ 239/488; 239/585

[58] Field of Search ........................ 239/464, 488, 585

[56] References Cited

U.S. PATENT DOCUMENTS

| | | | |
|---|---|---|---|
| 1,952,816 | 3/1934 | Mock | 239/488 |
| 2,096,581 | 10/1937 | Goldberg | 239/488 X |
| 3,884,417 | 5/1975 | Sheffield et al. | 239/488 X |
| 3,967,597 | 7/1976 | Schlagmuller et al. | 239/585 X |

*Primary Examiner*—Robert W. Saifer

*Attorney, Agent, or Firm*—Edwin E. Greigg

[57] ABSTRACT

An electromagnetic fuel injection valve in which a valve needle coupled to the armature has twisting channels for carrying fuel and for creating turbulence therein. The channels terminate in a pressure chamber whose ~~volume is chosen to be equal~~ to or smaller than the volume of fuel injected in a single stroke.

4 Claims, 1 Drawing Figure

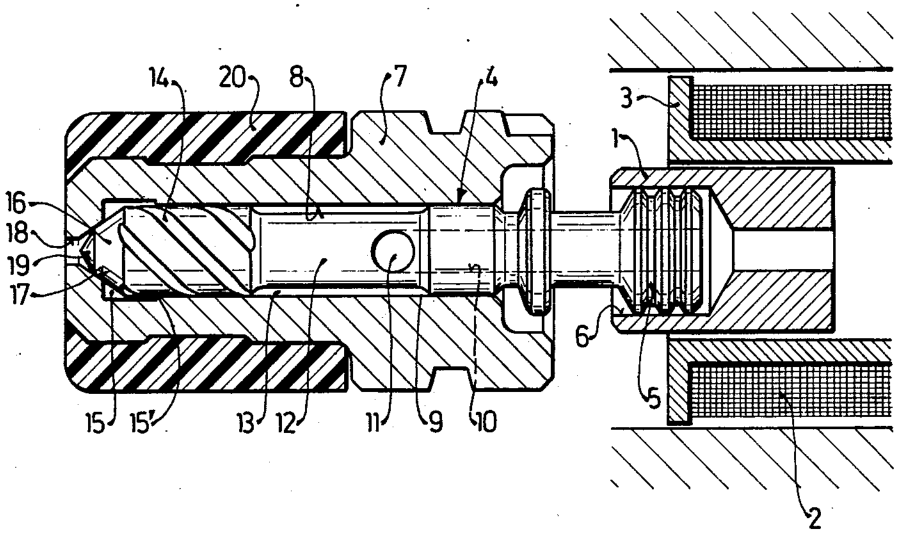
14
20
8
7
4
3
1
16
18
19
17
6
5
15
15'
13
12
11
9
10
2

ELECTROMAGNETIC FUEL INJECTION VALVE

BACKGROUND OF THE INVENTION

The invention relates to an electromagnetically actuated fuel injection valve for use in timed low pressure fuel injection systems in internal combustion engines employing induction tube injection. The type of valve to which this invention relates has a housing, and a fixed iron core located in the magnetic winding. Coaxially thereto, across an air gap, is a movable armature which carries a valve needle at the opposite end which moves in an appropriate coaxial bore of the armature. In such known injection valves, the supplied fuel quantity may become smaller during the course of extended use. Such phenomena are sometimes called "lean-out" and are very undesirable. The condition occurs particularly when fuel are used that have a high degree of residual constituents. Since injection valves often have an injection nipple, the leaning out of the fuel-air mixture is due to depositions at that nipple, as well as at the wall of the injection orifice, although to a lesser extent. A circular orifice, as is used when an injection nipple is employed, also favors such depositions.

OBJECT AND SUMMARY OF THE INVENTION

It is a principal object of the invention to provide a fuel injection valve of the general type described above in which no depositions of extraneous materials take place and which therefore does not suffer a reduction of the supplied fuel quantity but which provides good fuel preparation and a well-defined jet of injected fuel.

Since it has been shown that the exact volume of the pressure chamber immediately upstream of the injection elements is crucial to a good fuel preparation, it is a further object of the invention to optimize the volume of that pressure chamber.

These and other objects are attained according to the invention by providing the valve needle with serpentine grooves for creating turbulence in the fuel. The invention further provides that the serpentine grooves terminate in a pressure chamber penetrated by the valve needle and also provides that the dead volume equal to the pressure chamber volume is equal to or smaller than the volume of fuel delivered during a single injection cycle.

The invention will be better understood as well as further objects and advantages thereof become more apparent from the ensuing detailed description of a preferred embodiment.

BRIEF DESCRIPTION OF THE DRAWING

The single FIGURE of the drawing is a longitudinal cross-sectional side view of the terminal portion of the injection valve according to the invention.

DESCRIPTION OF THE PREFERRED EMBODIMENT

An electromagnetic fuel injection valve, not shown in all details, and connected to a fuel injection system of an internal combustion engine, includes an armature 1 which moves within a coil 2 carried on a coil carrier 3.

Fixedly attached to the armature is a valve needle 4 which is fitted into a recess 6 of the armature 1 and which has a multiply grooved end 5. The valve needle 4 is located in a nozzle body 7 which is fastened to the coil carrier 3 in a manner not shown. The nozzle body 7 is provided with a multiply stepped central bore 8 and a smooth central bore portion 9 for guiding the valve needle 4. The valve needle 4 itself is provided with a bore 10 which proceeds axially from the end 5 and terminates at transverse channels 11. The transverse channels 11 terminate in a narrowed region 12 of the valve needle 4 in the smooth inner bore 9 of the axial bore 8. The cooperation of the needle surface and the smooth bore 9 forms a cylindrical annular chamber 13. Beyond the narrowed portion 12, the valve needle 4 has the same diameter as the bore 8, but in that region it is provided with twisting grooves 14 which extend from the chamber 13 to a pressure chamber 15. The pressure chamber 15 is defined and limited by the injection valve elements which include a conical closure element 16 fastened to the valve needle 4 and a complementary conical seat 17 on nozzle body 7.

Following the injection valve elements 16/17, the nozzle body 7 has an orifice 18 and it will be noted that the valve needle 4 is provided with a point 19 which does not extend into the nozzle 18. Thus, the orifice 18 is not restricted by the needle.

The pressure chamber 15 is cylindrical and its outer diameter is defined by the inside diameter of the corresponding portion of the bore 8. The length of the pressure chamber 5 is defined by a shoulder 15'. The volume of the pressure chamber 15 is also defined by the outer contour of that portion of the valve needle 4 which extends into the pressure chamber 15. That remaining volume is dead volume of the injection valve and must be equal to or smaller than the volume of fuel injected during each injection cycle of the valve.

The nozzle body 7 is equipped with a protective cap 20 to provide thermal insulation.

The operation of the injection valve according to the invention is as follows:

Fuel flows through the bore 10 into the connection chamber 13 from which it reaches the twisted grooves 14 and experiences turbulation. Thus, the fuel reaches the pressure chamber 15 whose volume is very small in order that the total volume of fluid which must be accelerated by the motion of the injection member 16 during the injection cycle is as small as possible. Thus, when the injection valve 16/17 opens, the entire volume of the pressure chamber 15 is set into rotation and thus results in a good preparation of the fuel as well as providing an excellent jet formation by causing it to be pulled apart and expanded. A plastic protective cap 20 is affixed for thermal insulation so that engine heat is unable to heat up the valve assembly 16/17 excessively. Thus, the deposition of residual fuel constituents on surfaces of the valve is further inhibited.

What is claimed is:

1. In an electromagnetic fuel injection valve which includes a casing, a magnetic coil, a stationary iron core within said coil and a movable armature moving axially with said core within said casing and provided with a valve closing needle guided by portions of said casing for cooperation with an injection orifice obturated by said valve needle, the improvement comprising:
   - said valve needle is provided with a plurality of curved channels for carrying fuel and for imparting turbulence thereto; and
   - said casing and said valve needle together define a pressure chamber whose maximum volume is no greater than the volume of fuel from said valve during a single stroke.

2. An electromagnetic valve as defined by claim 1, wherein, when said valve is open, the axial extremity of said valve needle lies without the injection orifice of said valve.

3. An electromagnetic valve as defined by claim 1, wherein said pressure chamber lies upstream of, and adjacent to, said injection orifice and is traversed by said valve needle.

4. An electromagnetic valve as defined by claim 3, wherein said curved channels are so disposed on said valve needle as to terminate in said pressure chamber.

* * * * *